United States Patent [19]
Tsutsumi

[11] Patent Number: 5,737,127
[45] Date of Patent: Apr. 7, 1998

[54] SYSTEM OF FOCUSING ZOOM LENS

[75] Inventor: Katsuhisa Tsutsumi, Saitama-ken, Japan

[73] Assignee: Fuji Photo Optical Co., Ltd., Saitama-ken, Japan

[21] Appl. No.: 544,002

[22] Filed: Oct. 17, 1995

[30] Foreign Application Priority Data

Oct. 18, 1994 [JP] Japan ................... 6-251818

[51] Int. Cl.$^6$ .................................................. G02B 15/14
[52] U.S. Cl. ............................ 359/684; 359/687
[58] Field of Search ............................ 359/683, 676, 359/691, 693, 684, 687

[56] References Cited

U.S. PATENT DOCUMENTS

| | | | |
|---|---|---|---|
| 5,136,431 | 8/1992 | Terasawa et al. | 359/684 |
| 5,185,678 | 2/1993 | Arimoto | 359/684 |
| 5,515,204 | 5/1996 | Usui et al. | 359/684 |

FOREIGN PATENT DOCUMENTS

| | | |
|---|---|---|
| 5576318 | 6/1980 | Japan . |
| 574018 | 1/1982 | Japan . |

*Primary Examiner*—Scott J. Sugarman
*Attorney, Agent, or Firm*—Sixbey Friedman Leedom & Ferguson; Gerald J. Ferguson, Jr.; Evan R. Smith

[57] ABSTRACT

A zoom lens includes a front lens group, a zooming lens group and relay lens group arranged in this order from the object side. The zoom lens is focused by moving at least a part of the front lens group and a part of the relay lens group in the direction of the optical axis. The front lens group is moved so that the focusing movement of the front lens group for a given object point is smaller as compared with that by which the front lens group should be moved when the zoom lens is focused by moving solely the front lens group and the focusing error generated by such a movement of the front lens group is larger in the wide-side than the tele-side, and a part of the relay lens group is moved to correct the focusing error.

11 Claims, 13 Drawing Sheets

FIG.7A
f=8.29
FNo=1.51
----- d-Line
——— g-Line
-0.2 — 0.2
SPHERICAL ABERRATION

FIG.7B
f=8.29
ω/2=35.54°
----- MERIDIONAL PLANE
——— SAGITTAL PLANE
-0.2 — 0.2
ASTIGMATISM

FIG.7C
f=8.29
ω/2=35.54°
-10.0% — 10.0%
DISTORTION

FIG.7D
f=207.13
FNo 1.51
----- d-Line
——— g-Line
-0.2 — 0.2
SPHERICAL ABERRATION

FIG.7E
f=207.13
ω/2=0.99°
----- MERIDIONAL PLANE
——— SAGITTAL PLANE
-0.2 — 0.2
ASTIGMATISM

FIG.7F
f=207.13
ω/2=0.99°
-10.0% — 10.0%
DISTORTION

FIG.7G
f=414.27
FNo=2.30
----- d-Line
——— g-Line
-0.2 — 0.2
SPHERICAL ABERRATION

FIG.7H
f=414.27
ω/2=0.24°
----- MERIDIONAL PLANE
——— SAGITTAL PLANE
-0.2 — 0.2
ASTIGMATISM

FIG.7I
f=414.27
ω/2=0.24°
-10.0% — 10.0%
DISTORTION

FIG. 9A
f=12.28
FNo=2.25
---- d-line
—— g-line
-0.2 — 0.2
SPHERICAL
ABERRATION

FIG. 9B
f=12.28
ω/2=34.52°
---- MERIDIONAL PLANE
—— SAGITTAL PLANE
-0.2 — 0.2
ASTIGMATISM

FIG. 9C
f=12.28
ω/2=34.52°
-10.0% — 10.0%
DISTORTION

FIG. 9D
f=122.83
FNo=2.25
---- d-line
—— g-line
-0.2 — 0.2
SPHERICAL
ABERRATION

FIG. 9E
f=122.83
ω/2=3.27°
---- MERIDIONAL PLANE
—— SAGITTAL PLANE
-0.2 — 0.2
ASTIGMATISM

FIG. 9F
f=122.83
ω/2=3.27°
-10.0% — 10.0%
DISTORTION

FIG. 9G
f=212.50
FNo=2.82
---- d-Line
—— g-Line
-0.2 — 0.2
SPHERICAL
ABERRATION

FIG. 9H
f=212.50
ω/2=1.71°
---- MERIDIONAL PLANE
—— SAGITTAL PLANE
-0.2 — 0.2
ASTIGMATISM

FIG. 9I
f=212.50
ω/2=1.71°
-10.0% — 10.0%
DISTORTION

SYSTEM OF FOCUSING ZOOM LENS

BACKGROUND OF THE INVENTION

1. Field of the Invention

This invention relates to a system of focusing a zoom lens which is required to have a large aperture and a high performance, and more particularly to a system of focusing a zoom lens for a TV camera which is suitable for making the magnification of the zoom lens variable in a wider range, making the angle of view of the zoom lens wider and making the nearest object distance shorter.

2. Description of the Related Art

Recent zoom lenses for TV cameras are generally focused by moving a part of or all the lens groups on the object side of the zooming lens group. However such a system of focusing is disadvantageous in that focusing lens group far from a stop is fed forward when the zoom lens is focused on an object at the nearest object distance and accordingly the height from the optical axis in the focusing lens group of light rays to be imaged in the peripheral area becomes large, which results in a larger size of the focusing lens group. Though this problem may be avoided by shortening the focal length of the focusing lens group thereby reducing movement of the focusing lens group, shortening of the focal length of the focusing lens group results in deterioration in spherical aberration, coma, axial color aberration and the like especially on the tele-side, and the number of lens elements must be increased in order to correct such aberrations, which adds to the total weight of the zoom lens.

As other systems of focusing a zoom lens, there have been known those disclosed, for instance, in Japanese Unexamined Patent Publication Nos. 55(1980)-76318 and 57(1982)-4018.

In the system disclosed in the former publication, focusing is effected solely by the first lens group and zooming is effected by the first to third lens groups. In this system, the movement of the focusing lens group for a given object point is uniform over the entire zooming range and the height of peripheral light rays from the optical axis in the focusing lens group becomes large at the nearest object point near the wide-side end.

In the system disclosed in the latter publication, the focusing lens group is formed of a plurality of lens groups except the frontmost lens group, and focusing is effected by integrally moving the whole focusing lens group or by integrally moving some of the lens elements in one of the lens groups forming the focusing lens group. The movement of the focusing lens group is defined on one curve, whereby the zooming mechanism and the focusing mechanism are simplified.

However when making the magnification of the zoom lens variable in a wider range and making the angle of view of the zoom lens wider with one or more front lens group employed as the focusing lens group, the height of peripheral light rays from the optical axis in the front lens group becomes large at the nearest object point near the wide-side end and the front lens group must be large in size. On the other hand, when making the magnification of the zoom lens variable in a wider range and making the angle of view of the zoom lens wider with one of rearward lens groups employed as the focusing lens group, the movement of the focusing lens group becomes large at the nearest object distance at the tele-side end and it is difficult to get the space for accommodating such a large movement of the focusing lens group.

Especially in the case of a zoom lens for a TV camera where the focusing lens group is disposed forward of the zooming lens group, making the magnification of the zoom lens variable in a wider range, the angle of view of the zoom lens wider and the nearest object distance shorter at one time results in increase in size and weight of the focusing lens group, which gives rise to problems in manufacture and operation of the zoom lens.

SUMMARY OF THE INVENTION

In view of the foregoing observations and description, the primary object of the present invention is to provide a system of focusing a zoom lens for a TV camera where the focusing lens group is disposed forward of the zooming lens group which makes it feasible to make the magnification of the zoom lens variable in a wider range, the angle of view of the zoom lens wider and the nearest object distance shorter at one time without largely increasing the size and weight of the focusing lens group.

The focusing system of the present invention is for focusing a zoom lens comprising a front lens group, a zooming lens group and relay lens group arranged in this order from the object side and is characterized in that the zoom lens is focused by moving at least a part of the front lens group and a part of the relay lens group in the direction of the optical axis.

It is preferred that the front lens group be moved so that the focusing movement of the front lens group for a given object point is smaller as compared with that by which the front lens group should be moved when the zoom lens is focused by moving solely the front lens group and the focusing error generated by such a movement of the front lens group is larger in the wide-side than the tele-side, and said part of the relay lens group be moved to correct the focusing error.

Further it is preferred that the front lens group be moved to satisfy the following formulae over the entire zooming range $$X' = X \cdot f(Z)$$
$$0 \leq f(Z) \leq 1$$
$$(1 - 4 \cdot Z_t/Z^2)^{1/2} \leq f(Z) \leq \log(Z)/\log(Z_t^{1/2})$$

wherein $Z_t$ represents the total zoom ratio of the zoom lens, $f(Z)$ represents a function relating to the zoom ratio Z, X represents the movement by which the front lens group should be moved when the zoom lens is focused by moving solely the front lens group for a given finite object distance and X' represents the movement by which the front lens group should be moved when the zoom lens is focused by moving the front lens group and a part of the relay lens group for the given finite object distance.

The "focusing error" means the deviation of the image position from the front conjugate point of the zooming lens group when the focusing movement of the front lens group for a given object point is set smaller as compared with that by which the front lens group should be moved when the zoom lens is focused by moving solely the front lens group and the image position does not completely coincide with the front conjugate point of the zooming lens group.

The height of the peripheral light bundle in the front lens group of the zoom lens is maximized (the image circle is minimized) when the zoom lens is focused on the nearest object point at the wide-side end or near the wide-side end. In this regard, the focusing movement of the front lens group is minimized at the wide-side end or near the wide-side end in accordance with the system of the present invention, and accordingly, the height of the peripheral light bundle in the front lens group is reduced, whereby the front lens group can be small in the outer diameter.

Further in accordance with the system of the present invention, the height of the light bundle for a minimum image circle in the front lens group can be suppressed, and accordingly, the front lens group may be weak in refracting power, whereby especially the front lens group may be small in weight and the spherical aberration, coma, axial color aberration and the like of the zoom lens can be improved.

Further by defining a function f(Z) which satisfies the following formulae over the entire zooming range $$X' = X \cdot f(Z) \quad (1)$$
$$0 \leq f(Z) \leq 1$$
$$(1 - 4 \cdot Z/Z^2)^{1/2} \leq f(Z) \leq \log(Z)/\log(Z_t^{1/2})$$

wherein Zt represents the total zoom ratio of the zoom lens, f(Z) represents a function relating to the zoom ratio Z, X represents the movement by which the front lens group should be moved when the zoom lens is focused by moving solely the front lens group for a given finite object distance (that is, when the aforesaid focusing error is zero) and X' represents the movement by which the front lens group should be moved when the zoom lens is focused by moving the front lens group and a part of the relay lens group for the given finite object distance and moving the front lens group on the basis of the formula (1), it is feasible to make the magnification of the zoom lens variable in a wider range, the angle of view of the zoom lens wider and the nearest object distance shorter without largely increasing the size and weight of the focusing lens group. At the same time, the movement of the part of the relay lens group (rear focusing lens group) for correcting the focusing error generated by the aforesaid setting of the movement of the front lens group may be not so large and the space for accommodating the movement of the rear focusing lens group can be easily ensured, whereby the relation between the movements of the front lens group and the rear focusing lens group may be easily simple and the mechanism for moving them may be simple in structure.

DESCRIPTION OF THE PREFERRED EMBODIMENT

Figure 1A:
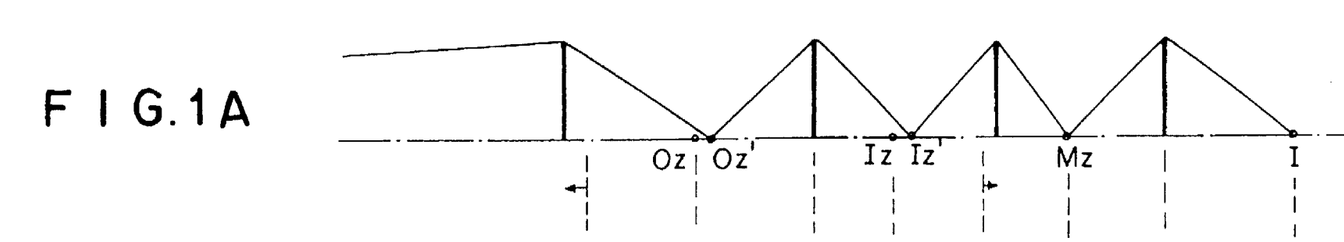
FIGS. 1A–1C is a schematic view showing image formation at a finite object point and at an infinite object point by the zoom lens focused in accordance with the present invention in relation with image formation at a finite object point by the conventional front lens group-focused zoom lens.
Figure 1B:
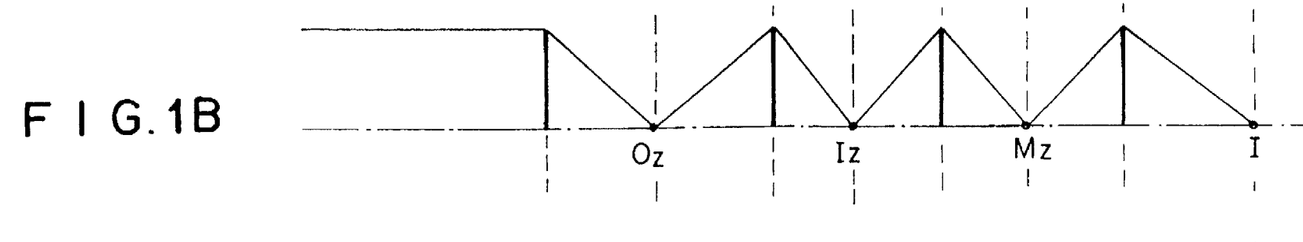
Figure 1C:
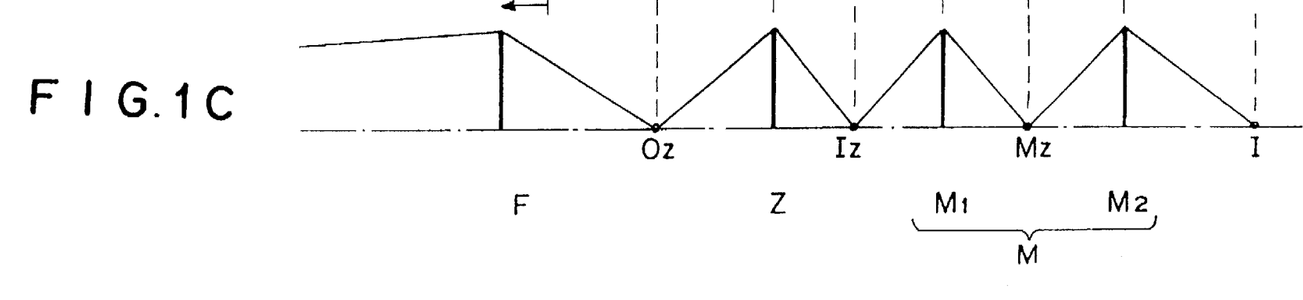

FIG. 1 shows image formation at a finite object point (a) and at an infinite object point (b) by the zoom lens focused in accordance with the present invention in relation with image formation at a finite object point by the conventional front lens group-focused zoom lens (c). As can be understood from the formula (1), X=X'=0 at an infinite object point, image formation is the same in the system of the present invention and in the conventional system. In FIG. 1, Oz and Iz respectively denote the object side and image side conjugate points of the zooming lens group and I denotes the image plane. In FIG. 1 at (a), Oz' denotes the image position by the front focusing lens group, Iz' denotes image position by the system including from the front focusing lens group to the zooming lens group and Mz denotes the image position by the system including from the front focusing lens group to the rear focusing lens group (a part of the relay lens group). F, Z and M at the lowermost row in FIG. 1 respectively denote the front focusing lens group, the zooming lens group and the master lens group (the relay lens group). The master lens group M consists a rear focusing lens group M1 which is movable and a fixed master lens group M2. Though the zooming lens group Z may comprise a plurality of lens groups, the zooming lens group Z shown in FIG. 1 consists of a single lens group for the purpose of simplicity.

In an optical system having an imaging magnification of β, shift of the image point Δα' for a small shift of the object position Δα is generally represented as follows.

$$\Delta\alpha' = \beta^2 \cdot \Delta\alpha \quad (2)$$

Figure 2:
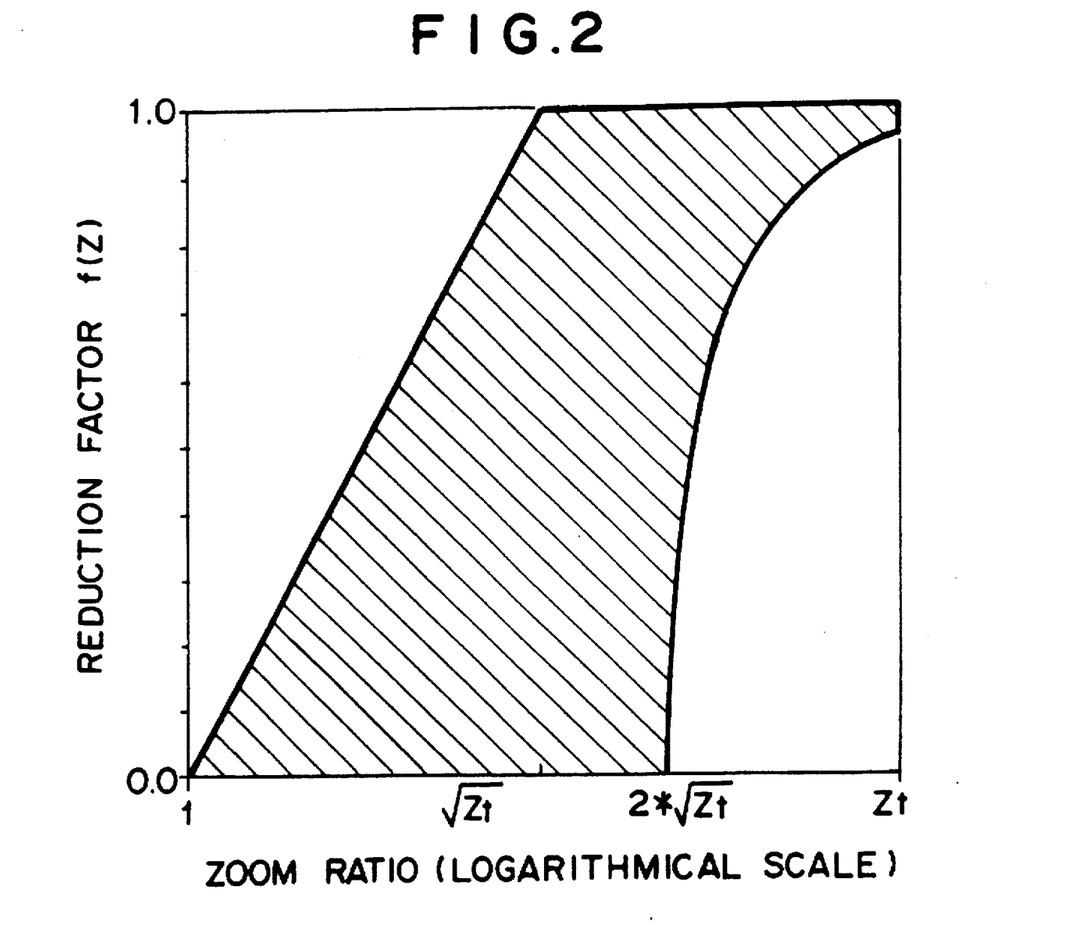
FIG. 2 is a graph showing the range of values the function f(Z) can take.

In this embodiment, since the front focusing lens group is moved on the basis of the formula (1), the distance OzOz' between the object side conjugate point Oz and the image position Oz' is as follows.

$$OzOz' = \{1-f(Z)\} \cdot X$$

wherein the function f(Z) takes a value uniquely defined for any value of Z in the hatched portion in FIG. 2. Representing the imaging magnifications of the zooming lens group and the total master lens group including the rear focusing lens group at a given zoom ratio Z by $\beta z$ and $\beta M$, respectively, and the distance between the conjugate point Iz and the image position Iz' by IzIz', the following formula (3) is satisfied so long as the distance OzOz' is small.

$$IzIz' = \{1-f(Z)\} \cdot X \cdot \beta z^2 \qquad (3)$$

The shift on the image plane side $\Delta I$ at this time is represented by the following formula (4) so long as the distance IzIz' is small.

$$\Delta I = IzIz' \cdot \beta_M^2 = \{1-f(Z)\} \cdot X \cdot \beta z^2 \cdot \beta_M^2 \qquad (4)$$

Representing the movement of the rear focusing lens group by $\Delta M$ and the movement of the image plane by $\Delta M'$ and assuming that $$\Delta M' = k \cdot \Delta M \qquad (5),$$

$$\Delta M = k^{-1} \cdot \Delta I = k^{-1} \cdot \{1-f(Z)\} \cdot X \cdot \beta z^2 \cdot \beta_M^2 \qquad (6)$$

from the formula (4) and (5). Further, representing the focal length of the front focusing lens group by $f_F$ and the focal length of the zoom lens at the wide-side end by $f_W$, $$\beta z \cdot \beta_M = f_W \cdot f_F^{-1} \cdot Z = A \cdot Z \quad (A = f_W \cdot f_F^{-1}).$$

Accordingly, the formula (6) can be transformed as follows.

$$\Delta M = A^2 \cdot Z^2 \cdot k^{-1} \cdot \{1-f(Z)\} \cdot X \qquad (7)$$

Thus by moving the front focusing lens group and the rear focusing lens group respectively on the basis of the formulae (1) and (7), the zoom lens can be focused. However since the relation of the formulae above is satisfied only when the formula (2) is satisfied, actually a function k(Z,F) for zooming and focusing is defined to absorb the error in the formulae above. As a result, the movement of the rear focusing lens group in the system of the present invention is given by the following formula (8) obtained by modifying the formula (7).

$$\Delta M(Z,F) = A^2 \cdot Z^2 \cdot k(Z,F)^{-1} \cdot \{1-f(Z)\} \cdot X \qquad (8)$$

In the zoom lens focusing system in accordance with the present invention, since the front focusing lens group is moved so that focusing error by the front focusing lens is large on the wide-side and small on tele-side, the value of $\beta z^2$ in the formula (3) is relatively small on the wide-side, whereby the value of the IzIz' can be very small. Accordingly, the movement of the rear focusing lens group may be small. On the tele-side, the value of the term $\{1-f(Z)\}$ is set small whereby the movement of the rear focusing lens group may be small. More particularly, the focusing movement X of the front focusing lens group required to focus the zoom lens by moving solely the front focusing lens group for a given object point is detected through a signal from a control means for controlling the movement of the front focusing lens group and the movement X' of the front focusing lens group by which the front focusing lens group is to be moved according to the focusing system of the present invention is determined by modifying the focusing movement X with the function f(Z) of the zoom ratio Z. The value of the X' is set so that the focusing error generated by the movement of the front focusing lens group is large on the wide-side and small on the tele-side. The movement of the rear focusing lens group is defined the formula (8) and the value of $\Delta M(Z,F)$ may be stored in a memory such as a ROM. When $\Delta M$ is defined as a function $\Delta M(Z,F,I)$ of the zoom ratio Z, the focus F and the diameter of the stop $I(F_{NO})$, there is obtained a lens system in which also the movement of focus solely by the stop is completely corrected.

Embodiments of the present invention will be described on the basis of concrete values, hereinbelow.

First Embodiment

Figure 3:
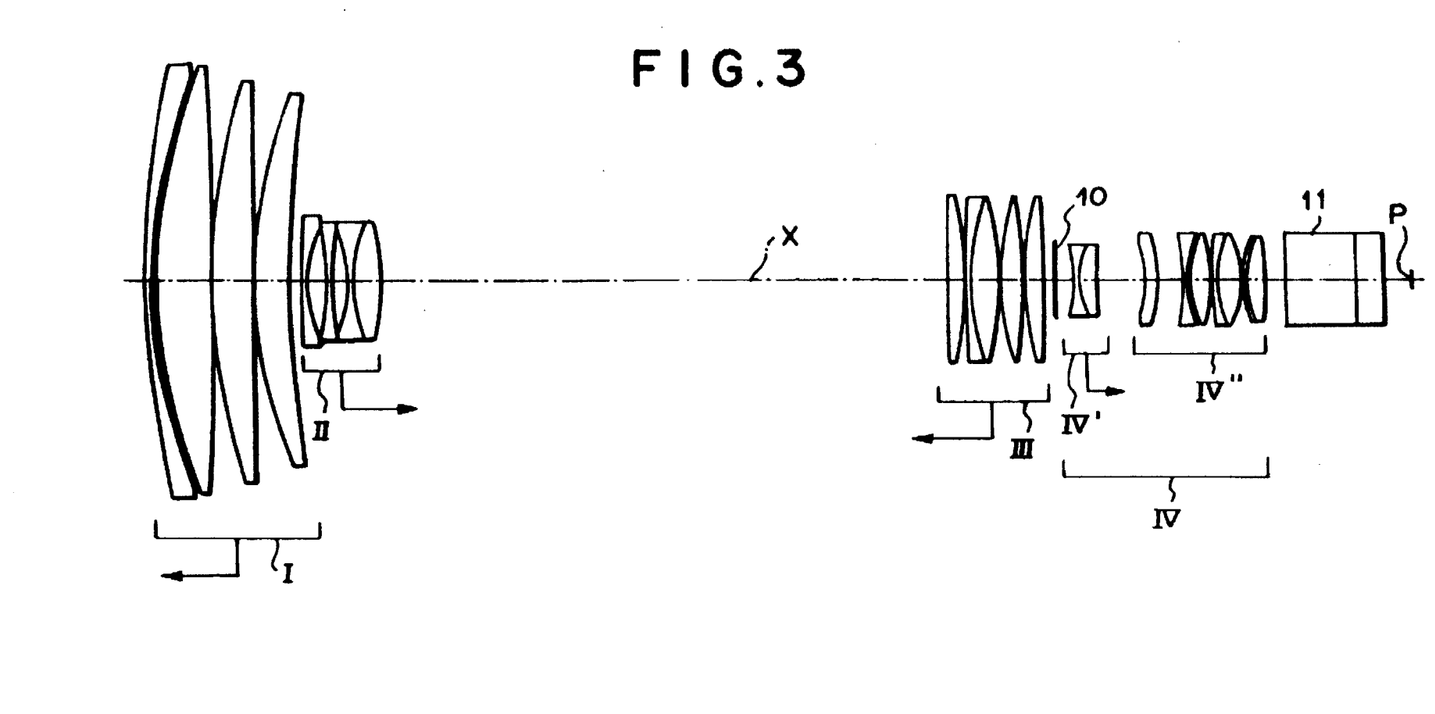
FIG. 3 is a view showing the arrangement of the lens elements in a zoom lens of a first embodiment of the present invention.

FIG. 3 shows an arrangement of lens elements at the wide-side end and an infinite object point of a zoom lens in accordance with a first embodiment of the present invention (employing the focusing system of the present invention). As shown in FIG. 3, the zoom lens comprises a front focusing lens group I, zooming lens groups II and III, a master lens group IV, a stop 10 and a color separation prism 11. The master lens group IV consists of a rear focusing lens group IV' which is movable and a fixed lens group IV". The front focusing lens group I, the zooming lens groups II and III and the rear focusing lens group IV' are movable respectively in the direction of the arrows. In FIG. 3, X denotes the optical axis and P denotes the image position.

The radii of curvature R (mm) of the refracting surfaces, the axial surface separations D (the central thicknesses of the lens elements or the air separations), the refractive indexes $N_d$ for the sodium d-line of the lens elements and the Abbe's number $v_d$ of the lens elements in the zoom lens of the first embodiment are as shown in the following table 1. In table 1, the numbers in the leftmost column designates the numbers of the symbols R, D, $n_d$ and $v_d$ as numbered from the object side. (the same for all the tables in this specification)

TABLE 1

| | R | D | Nd | vd |
|---|---|---|---|---|
| 1 | 417.806 | 4.40 | 1.80517 | 25.4 |
| 2 | 249.576 | 1.57 | 1.00000 | |
| 3 | 252.156 | 27.00 | 1.43387 | 95.1 |
| 4 | −2755.440 | 0.25 | 1.00000 | |
| 5 | 289.201 | 20.50 | 1.49700 | 81.6 |
| 6 | 5362.652 | 0.25 | 1.00000 | |
| 7 | 228.488 | 16.50 | 1.59240 | 68.3 |
| 8 | 556.837 | D1 | 1.00000 | |
| 9 | 462.765 | 2.10 | 1.88299 | 40.9 |
| 10 | 53.344 | 10.00 | 1.00000 | |
| 11 | −119.742 | 2.05 | 1.83499 | 42.7 |
| 12 | 152.374 | 7.70 | 1.00000 | |
| 13 | −63.629 | 2.10 | 1.80236 | 46.7 |
| 14 | 69.269 | 13.51 | 1.84665 | 23.9 |
| 15 | −103.884 | D2 | 1.00000 | |
| 16 | −5186.084 | 8.32 | 1.56907 | 71.3 |
| 17 | −175.269 | 0.20 | 1.00000 | |
| 18 | 1144.300 | 2.30 | 1.84665 | 23.9 |
| 19 | 117.761 | 14.67 | 1.49700 | 81.6 |
| 20 | −134.742 | 0.20 | 1.00000 | |
| 21 | 126.662 | 11.18 | 1.43426 | 94.8 |

TABLE 1-continued

| | | | | |
|---|---|---|---|---|
| 22 | −234.076 | 0.20 | 1.00000 | |
| 23 | 153.547 | 9.30 | 1.43426 | 94.8 |
| 24 | −520.991 | D3 | 1.00000 | |
| 25 | 0.0 | 9.50 | 1.00000 | |
| 26 | −64.259 | 1.70 | 1.72915 | 54.7 |
| 27 | 30.471 | 9.80 | 1.84665 | 23.9 |
| 28 | 194.374 | 22.08 | 1.00000 | |
| 29 | −51.460 | 6.12 | 1.51728 | 69.7 |
| 30 | −69.343 | 12.00 | 1.00000 | |
| 31 | −154.655 | 2.00 | 1.88299 | 40.8 |
| 32 | 48.043 | 2.00 | 1.00000 | |
| 33 | 51.949 | 10.60 | 1.51728 | 69.7 |
| 34 | −69.186 | 0.20 | 1.00000 | |
| 35 | 303.779 | 2.00 | 1.80099 | 35.0 |
| 36 | 51.52G | 12.00 | 1.51728 | 69.7 |
| 37 | −44.187 | 0.20 | 1.00000 | |
| 38 | 50.045 | 2.00 | 1.80517 | 25.4 |
| 39 | 43.054 | 9.40 | 1.51728 | 69.7 |
| 40 | −154.266 | 0.0 | 1.00000 | |
| 41 | 0.0 | 33.00 | 1.58267 | 46.5 |
| 42 | 0.0 | 13.20 | 1.51633 | 64.0 |
| 43 | 0.0 | 0.00 | 1.00000 | |

| | | | |
|---|---|---|---|
| f | 8.29 | 207.13 | 414.27 |
| D1 | 5.19 | 177.57 | 187.93 |
| D2 | 271.41 | 40.25 | 4.68 |
| D3 | 4.88 | 63.66 | 88.87 |

In table 1, D1, D2 and D3 are variable and the values of D1, D2 and D3 at focal lengths f of 8.29 mm, 207.13 mm and 414.27 mm are shown below table b 1.

The stop 10 is disposed between the zooming lens group III and the rear focusing lens group IV'.

Second Embodiment

Figure 4:
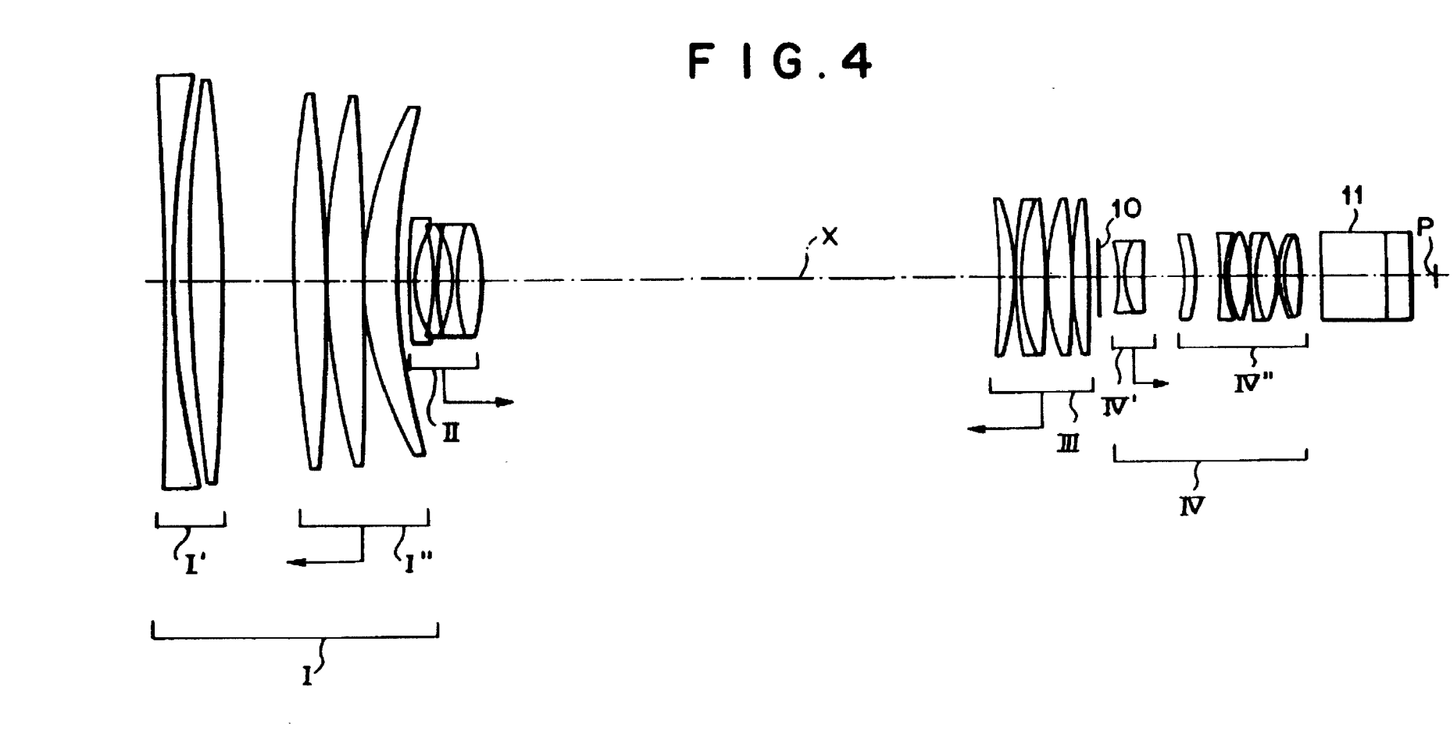
FIG. 4 is a view showing the arrangement of the lens elements in a zoom lens of a second embodiment of the present invention.

FIG. 4 shows an arrangement of lens elements at the wide-side end and an infinite object point of a zoom lens in accordance with a second embodiment of the present invention. As shown in FIG. 4, the zoom lens comprises a focusing lens group I, zooming lens groups II and III, a master lens group IV, a stop 10 and a color separation prism 11. The focusing lens group I consists of a fixed lens group I' and a movable focusing lens group I" and the master lens group IV consists of a rear focusing lens group IV' which is movable and a fixed lens group IV". The movable focusing lens group I', the zooming lens groups II and III and the rear focusing lens group IV' are movable respectively in the direction of the arrows. In FIG. 4, X denotes the optical axis and P denotes the image position.

The radii of curvature R (mm) of the refracting surfaces, the axial surface separations D (the central thicknesses of the lens elements or the air separations), the refractive indexes $N_d$ for the sodium d-line of the lens elements and the Abbe's number $v_d$ of the lens elements in the zoom lens of the second embodiment are as shown in the following table 2.

TABLE 2

| | R | D | Nd | vd |
|---|---|---|---|---|
| 1 | −3204.996 | 4.40 | 1.75519 | 27.5 |
| 2 | 434.818 | 8.00 | 1.00000 | |
| 3 | 620.178 | 16.50 | 1.43387 | 95.1 |
| 4 | −1162.039 | 36.52 | 1.00000 | |
| 5 | 575.106 | 17.00 | 1.49700 | 81.6 |
| 6 | −838.630 | 0.25 | 1.00000 | |
| 7 | 330.807 | 19.00 | 1.49700 | 81.6 |
| 8 | −2044.964 | 0.25 | 1.00000 | |
| 9 | 172.038 | 16.00 | 1.59240 | 68.3 |

TABLE 2-continued

| | | | | |
|---|---|---|---|---|
| 10 | 302.597 | D1 | 1.00000 | |
| 11 | 258.962 | 2.10 | 1.88299 | 40.9 |
| 12 | 46.400 | 10.00 | 1.00000 | |
| 13 | −111.624 | 2.05 | 1.83499 | 42.7 |
| 14 | 136.466 | 7.70 | 1.00000 | |
| 15 | −53.612 | 2.10 | 1.80236 | 46.7 |
| 16 | 92.346 | 13.51 | 1.84665 | 23.9 |
| 17 | −79.400 | D2 | 1.00000 | |
| 18 | −325.547 | 8.00 | 1.56907 | 71.3 |
| 19 | −113.327 | 0.20 | 1.00000 | |
| 20 | 223.004 | 2.30 | 1.84665 | 23.9 |
| 21 | 98.442 | 13.50 | 1.49700 | 81.6 |
| 22 | −269.650 | 0.20 | 1.00000 | |
| 23 | 111.746 | 12.80 | 1.43426 | 94.8 |
| 24 | −338.524 | 0.27 | 1.00000 | |
| 25 | 193.594 | 8.50 | 1.43426 | 94.8 |
| 26 | −488.342 | D3 | 1.00000 | |
| 27 | 0.0 | 10.16 | 1.00000 | |
| 28 | −63.050 | 1.70 | 1.72915 | 54.7 |
| 29 | 30.963 | 9.80 | 1.84665 | 23.9 |
| 30 | 160.613 | 22.08 | 1.00000 | |
| 31 | −53.139 | 6.12 | 1.51728 | 69.7 |
| 32 | −65.777 | 12.00 | 1.00000 | |
| 33 | −266.218 | 2.00 | 1.88299 | 40.8 |
| 34 | 50.677 | 2.00 | 1.00000 | |
| 35 | 52.668 | 10.60 | 1.51728 | 69.7 |
| 36 | −65.399 | 0.20 | 1.00000 | |
| 37 | 472.769 | 2.00 | 1.80099 | 35.0 |
| 38 | 48.457 | 12.00 | 1.51728 | 69.7 |
| 39 | −52.343 | 0.20 | 1.00000 | |
| 40 | 51.708 | 2.00 | 1.80517 | 25.4 |
| 41 | 42.412 | 9.40 | 1.51728 | 69.7 |
| 42 | −112.857 | 0.0 | 1.00000 | |
| 43 | 0.0 | 33.00 | 1.58267 | 46.5 |
| 44 | 0.0 | 13.20 | 1.51633 | 64.0 |
| 45 | 0.0 | 0.00 | 1.00000 | |

| | | | |
|---|---|---|---|
| f | 8.26 | 206.48 | 412.96 |
| D1 | 5.99 | 169.51 | 179.24 |
| D2 | 263.50 | 40.13 | 4.85 |
| D3 | 4.91 | 64.76 | 90.32 |

In table 2, D1, D2 and D3 are variable and the values of D1, D2 and D3 at focal lengths f of 8.26 mm, 206.48 mm and 412.96 mm are shown below table 2.

The stop 10 is disposed between the zooming lens group III and the rear focusing lens group IV'.

Third Embodiment

Figure 5:
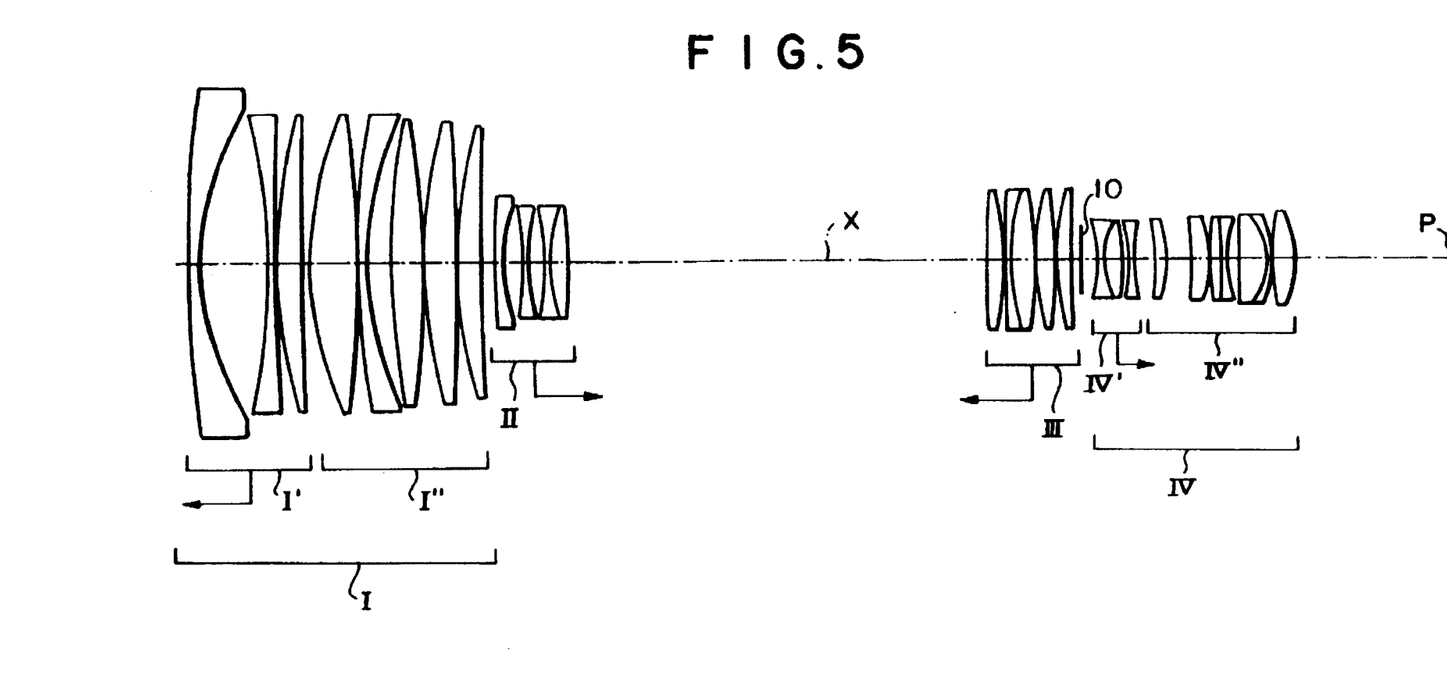
FIG. 5 is a view showing the arrangement of the lens elements in a zoom lens of a third embodiment of the present invention.

FIG. 5 shows an arrangement of lens elements at the wide-side end and an infinite object point of a zoom lens in accordance with a third embodiment of the present invention. As shown in FIG. 5, the zoom lens comprises a focusing lens group I, zooming lens groups II and III, a master lens group IV and a stop 10. The focusing lens group I consists of a fixed lens group I' and a movable focusing lens group I" and the master lens group IV consists of a rear focusing lens group IV' which is movable and a fixed lens group IV". The movable focusing lens group I', the zooming lens groups II and III and the rear focusing lens group IV' are movable respectively in the direction of the arrows. In FIG. 5, X denotes the optical axis and P denotes the image position.

The radii of curvature R (mm) of the refracting surfaces, the axial surface separations D (the central thicknesses of the lens elements or the air separations), the refractive indexes $N_d$ for the sodium d-line of the lens elements and the Abbe's number $v_d$ of the lens elements in the zoom lens of the third embodiment are as shown in the following table 3.

TABLE 3

| | R | D | Nd | vd |
|---|---|---|---|---|
| 1 | 557.674 | 4.30 | 1.77250 | 49.6 |
| 2 | 112.434 | 28.00 | 1.00000 | |
| 3 | −261.504 | 3.80 | 1.77250 | 49.6 |
| 4 | 1511.372 | 1.00 | 1.00000 | |
| 5 | 220.911 | 10.00 | 1.84665 | 23.9 |
| 6 | 1851.518 | 3.50 | 1.00000 | |
| 7 | 140.717 | 20.00 | 1.43875 | 94.9 |
| 8 | −533.163 | 0.20 | 1.00000 | |
| 9 | 327.636 | 3.70 | 1.80517 | 25.4 |
| 10 | 123.960 | 10.00 | 1.00000 | |
| 11 | 256.585 | 14.00 | 1.49700 | 81.6 |
| 12 | −390.798 | 0.20 | 1.00000 | |
| 13 | 199.332 | 13.50 | 1.49700 | 81.6 |
| 14 | −1588.801 | 0.20 | 1.00000 | |
| 15 | 178.311 | 10.50 | 1.58913 | 61.2 |
| 16 | 1463.638 | D1 | 1.00000 | |
| 17 | 312.156 | 3.00 | 1.74100 | 52.6 |
| 18 | 60.683 | 9.00 | 1.00000 | |
| 19 | −124.275 | 2.00 | 1.80609 | 40.9 |
| 20 | 87.224 | 7.00 | 1.00000 | |
| 21 | −97.663 | 2.00 | 1.72916 | 54.7 |
| 22 | 66.987 | 8.30 | 1.84665 | 23.9 |
| 23 | −198.160 | D2 | 1.00000 | |
| 24 | 380.255 | 7.00 | 1.49700 | 81.6 |
| 25 | −115.029 | 0.20 | 1.00000 | |
| 26 | 521.702 | 2.40 | 1.84665 | 23.9 |
| 27 | 90.397 | 10.00 | 1.49700 | 81.6 |
| 28 | −174.832 | 0.20 | 1.00000 | |
| 29 | 103.262 | 8.00 | 1.49700 | 81.6 |
| 30 | −183.397 | 0.20 | 1.00000 | |
| 31 | 96.388 | 6.00 | 1.49700 | 81.6 |
| 32 | 1604.787 | D3 | 1.00000 | |
| 33 | 0.0 | 6.50 | 1.00000 | |
| 34 | −52.225 | 2.00 | 1.77250 | 49.6 |
| 35 | 31.427 | 7.40 | 1.84665 | 23.9 |
| 36 | −119.530 | 2.30 | 1.00000 | |
| 37 | −85.031 | 2.00 | 1.80400 | 46.6 |
| 38 | 68.440 | 8.70 | 1.00000 | |
| 39 | −89.976 | 5.00 | 1.73399 | 51.5 |
| 40 | −51.504 | 10.00 | 1.00000 | |
| 41 | −134.612 | 8.00 | 1.51680 | 64.2 |
| 42 | −47.082 | 0.20 | 1.00000 | |
| 43 | 187.318 | 5.00 | 1.51741 | 52.4 |
| 44 | −221.074 | 2.00 | 1.83480 | 42.7 |
| 45 | 45.975 | 5.00 | 1.00000 | |
| 46 | 1532.884 | 12.30 | 1.51680 | 64.2 |
| 47 | −24.204 | 2.00 | 1.80517 | 25.4 |
| 48 | −46.081 | 0.20 | 1.00000 | |
| 49 | 109.532 | 9.70 | 1.51680 | 64.2 |
| 50 | −43.842 | 0.00 | 1.00000 | |
| | 12.28 | 122.83 | 212.50 | |
| D1 | 5.61 | 120.00 | 131.86 | |
| D2 | 174.99 | 30.00 | 5.14 | |
| D3 | 4.12 | 34.72 | 47.73 | |

In table 3, D1, D2 and D3 are variable and the values of D1, D2 and D3 at focal lengths f of 12.28 mm, 122.83 mm and 212.50 mm are shown below table 3.

The stop 10 is disposed between the zooming lens group III and the rear focusing lens group IV'.

Figure 6:
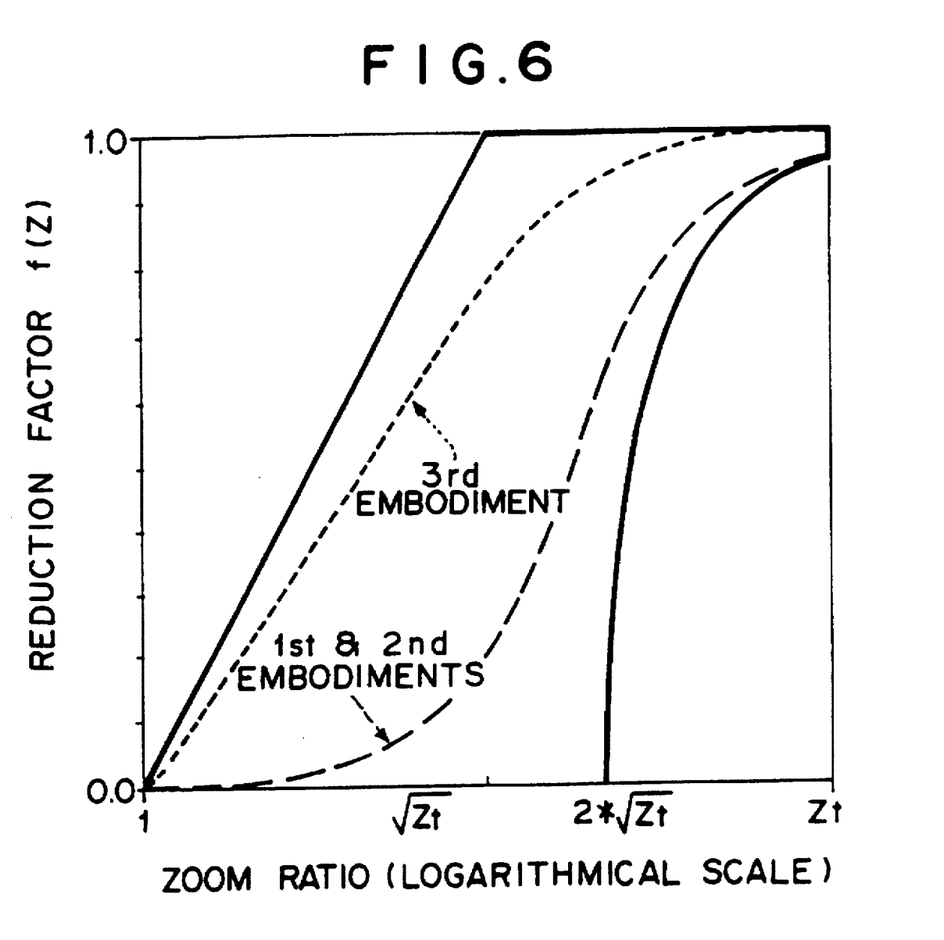
FIG. 6 is a graph showing the range of values the function f(Z) can take in the zoom lenses of the first to third embodiments of the present invention.

FIG. 6 shows reduction factor in the focusing movement of the front focusing lens group in the zoom lenses of the first to third embodiments. As can be understood from FIG. 6, the reduction factor in each of the zoom lenses is within the range of reduction factor f(Z) shown in FIG. 2.

Figure 11:
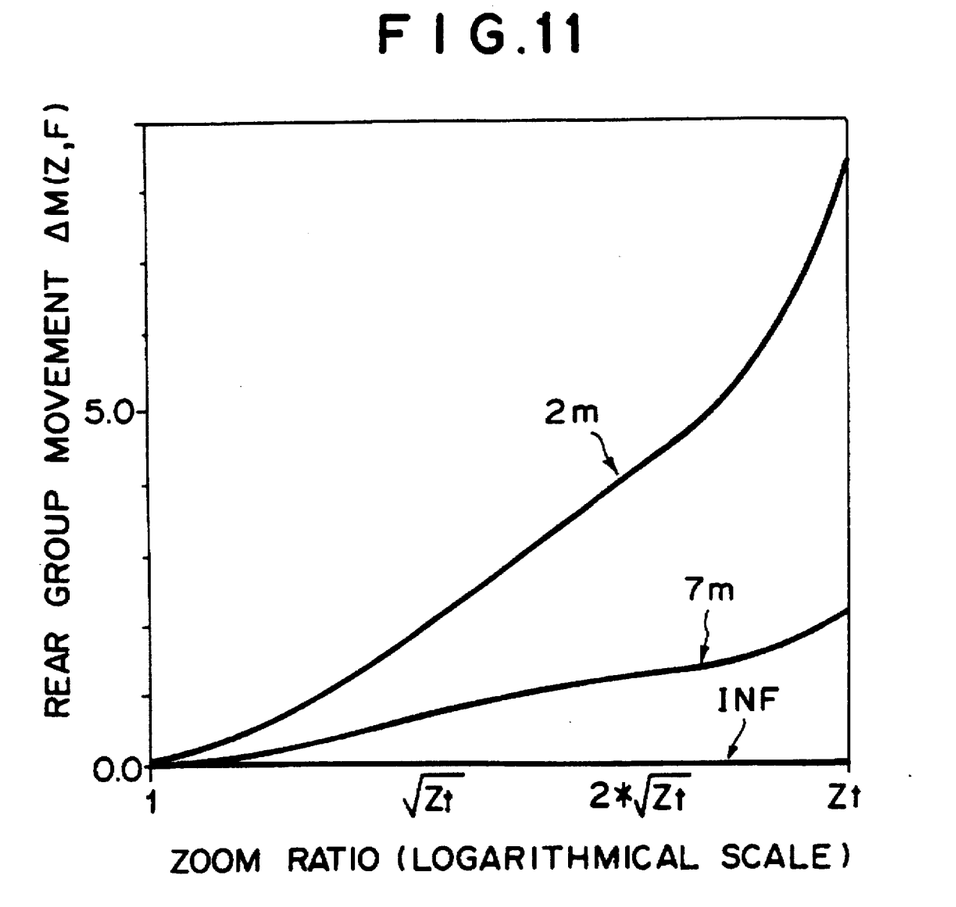
FIG. 11 is a graph showing the relation between the movement of the rear focusing lens group and the object distance in the zoom lens of the first embodiment.
Figure 12:
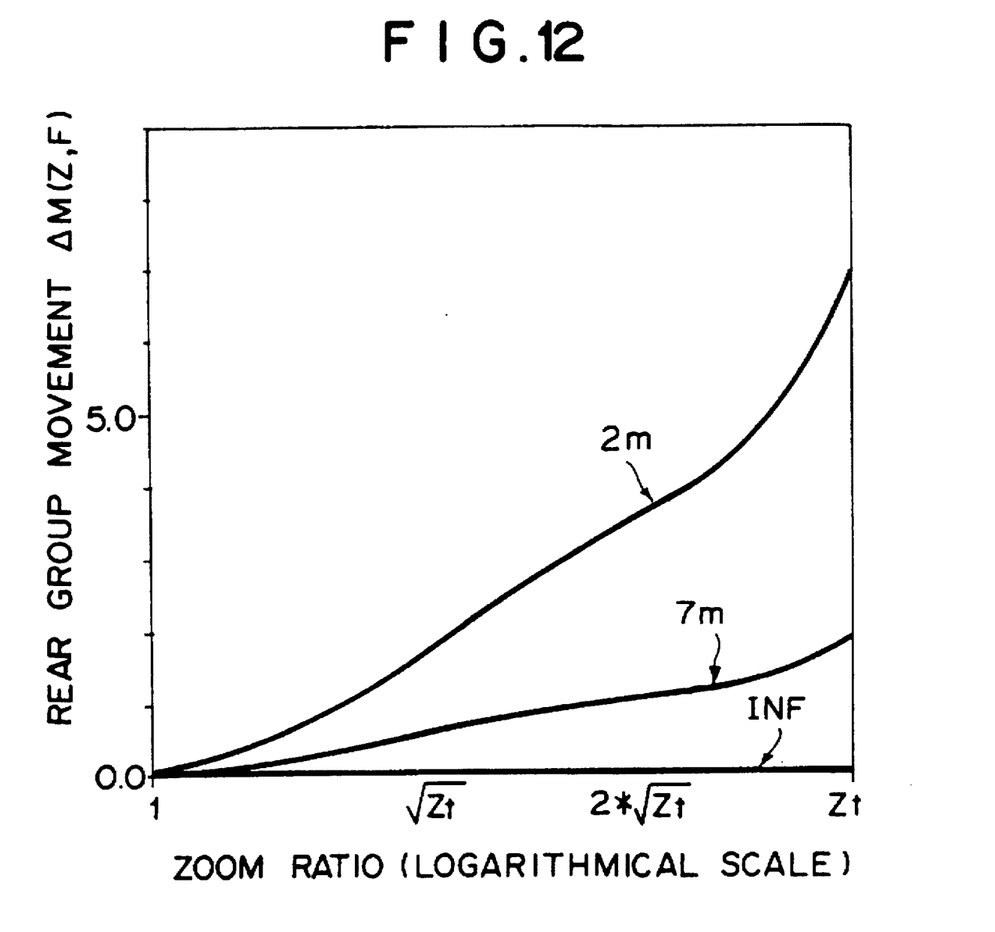
FIG. 12 is a graph showing the relation between the movement of the rear focusing lens group and the object distance in the zoom lens of the second embodiment.
Figure 13:
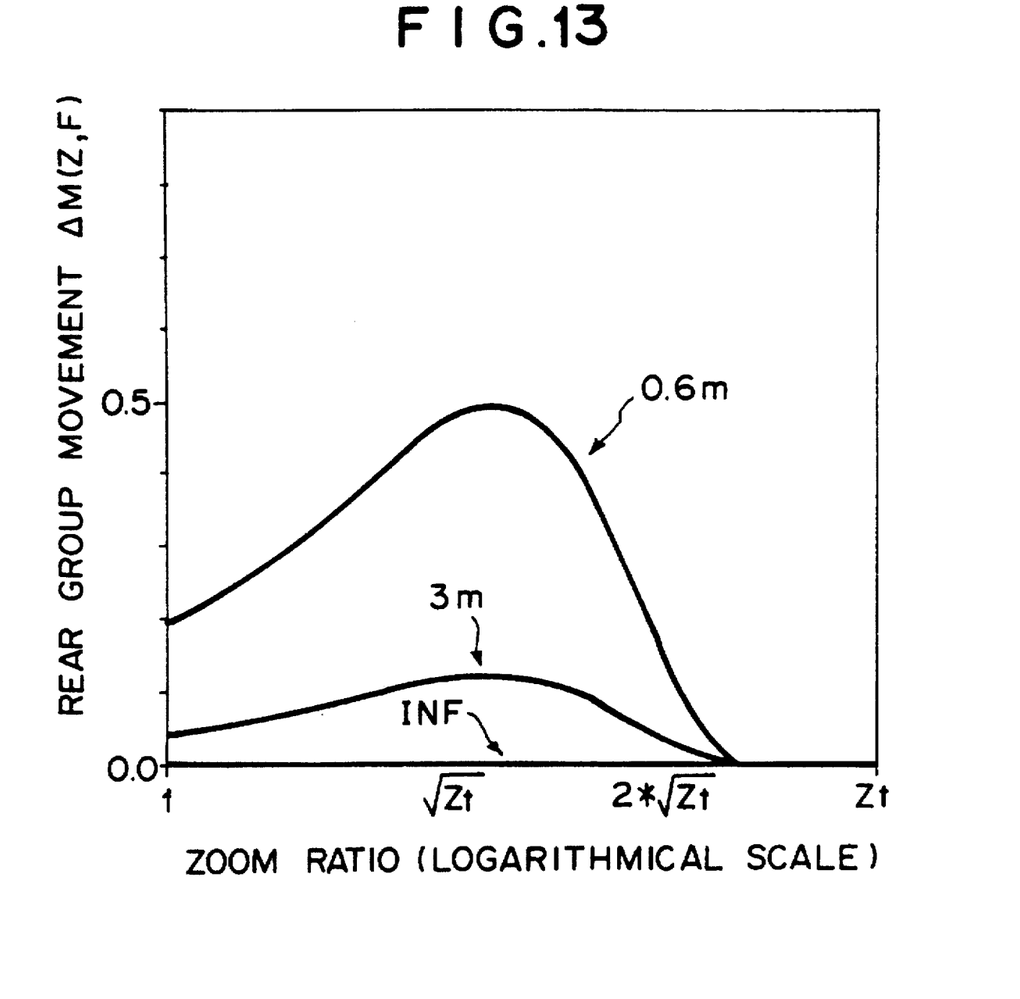
FIG. 13 is a graph showing the relation between the movement of the rear focusing lens group and the object distance in the zoom lens of the third embodiment.

The movements ΔM(Z,F) of the rear focusing lens group IV' versus the zoom ratio Zt in the first to third embodiments are shown in FIGS. 11 to 13, respectively. In FIGS. 11 to 13, "2m" and "7m" are object distances and "INF" denotes an infinite object distance.

Figure 7A:
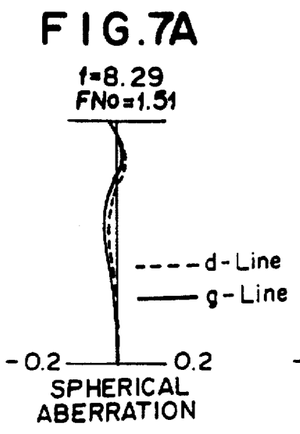
FIGS. 7A to 7C are views showing spherical aberration, astigmatism and distortion at a focal length of 8.29 mm of the zoom lens of the first embodiment.
Figures 7B, 7C:
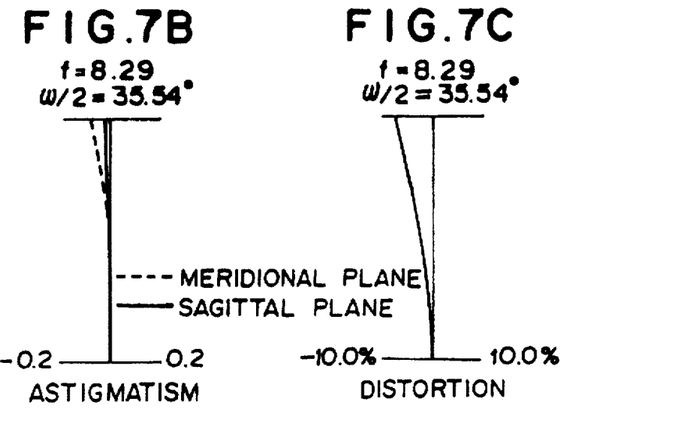
Figure 7D:
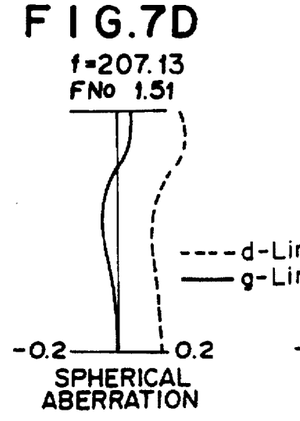
FIGS. 7D to 7F are views showing the same at a focal length of 207.13 mm
Figures 7E, 7F:
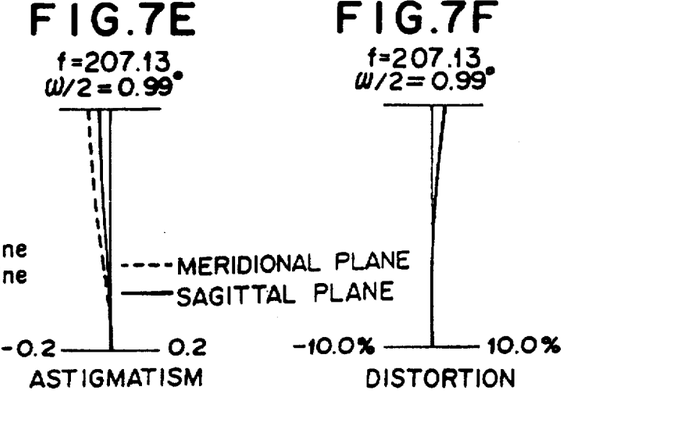
Figure 7G:
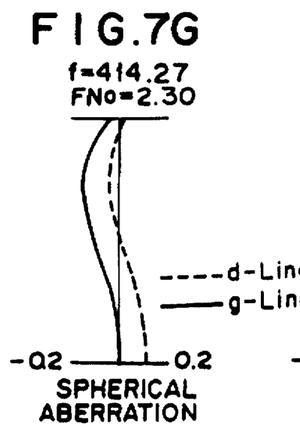
FIGS. 7G to 7I are views showing the same at a focal length of 414.27 mm.
Figures 7H, 7I:
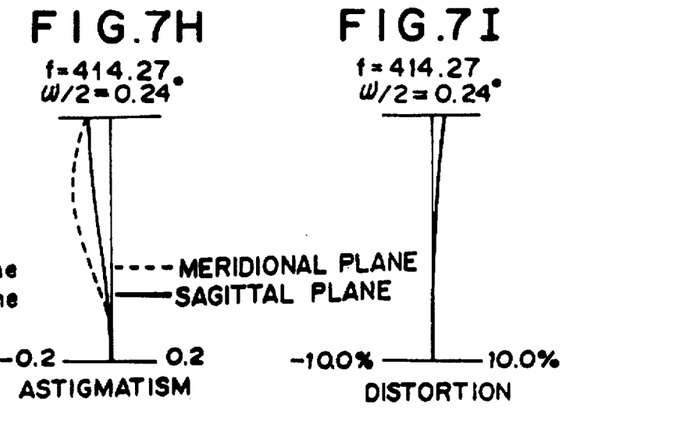
Figures 8A, 8B, 8C:
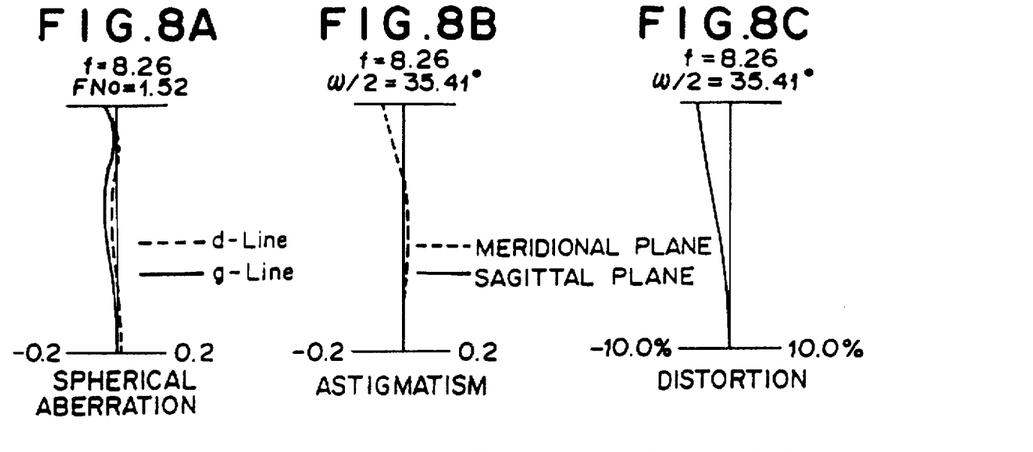
FIGS. 8A to 8C are views showing spherical aberration, astigmatism and distortion at a focal length of 8.26 mm of the zoom lens of the second embodiment.
Figures 8D, 8E, 8F:
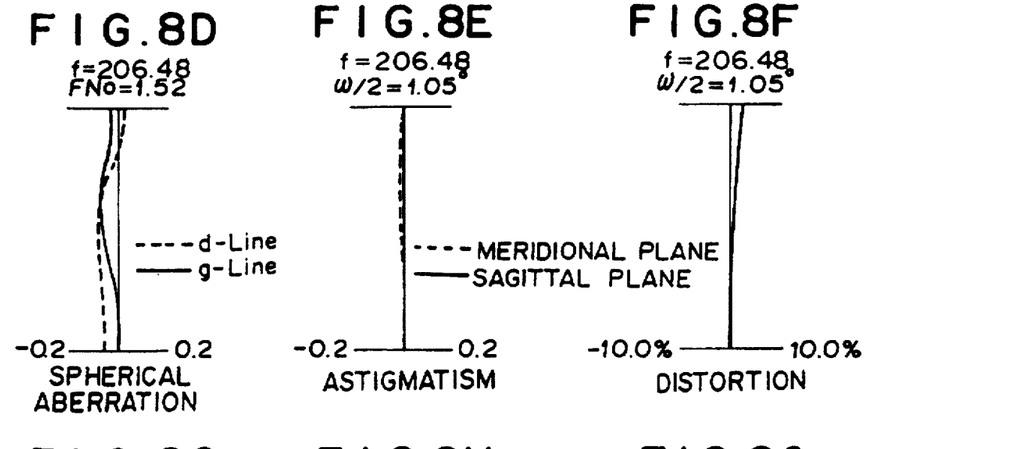
FIGS. 8D to 8F are views showing the same at a focal length of 206.48 mm
Figures 8G, 8H, 8I:
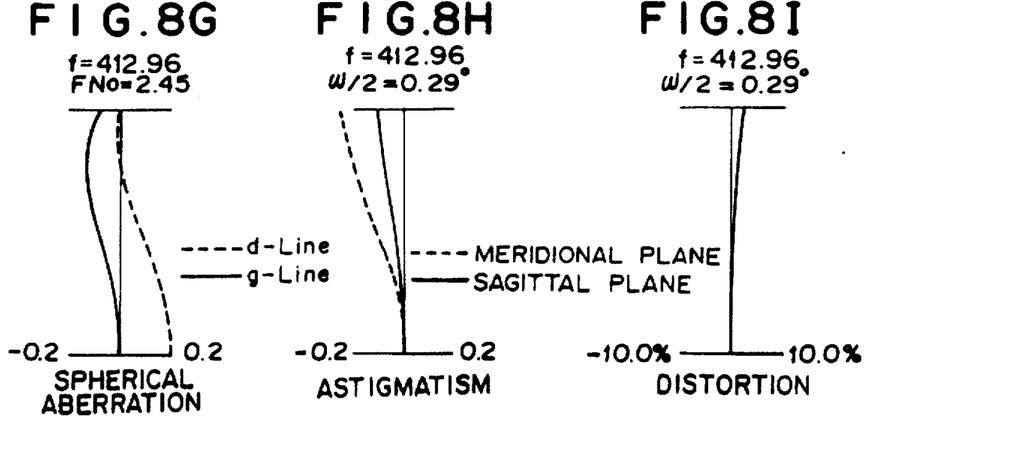
FIGS. 8G to 8I are views showing the same at a focal length of 412.96 mm.
Figure 9A:
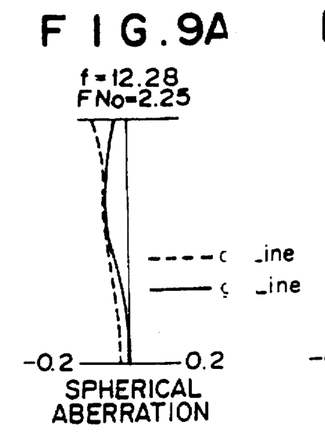
FIGS. 9A to 9C are views showing spherical aberration, astigmatism and distortion at a focal length of 12.28 mm of the zoom lens of the third embodiment.
Figures 9B, 9C:
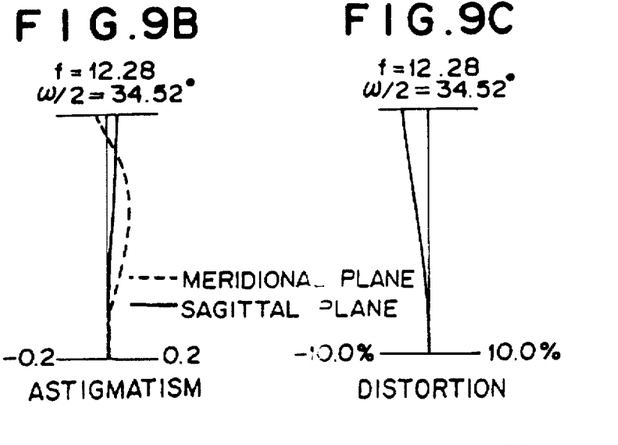
Figure 9D:
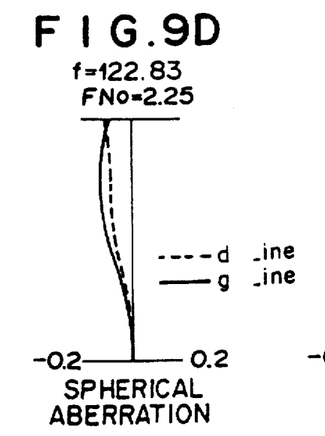
FIGS. 9D to 9F are views showing the same at a focal length of 122.83 mm
Figures 9E, 9F:
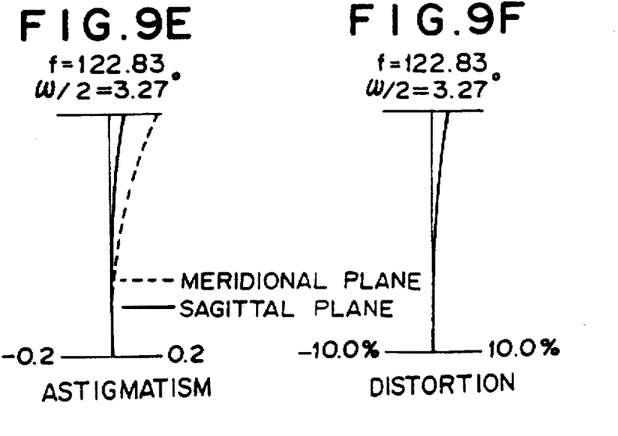
Figure 9G:
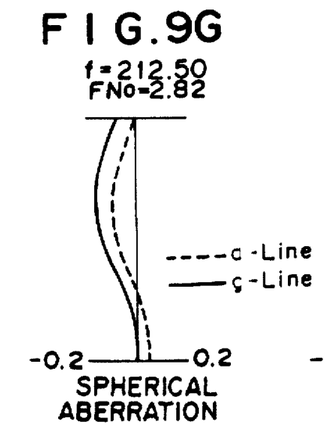
FIGS. 9G to 9I are views showing the same at a focal length of 212.50 mm.
Figures 9H, 9I:
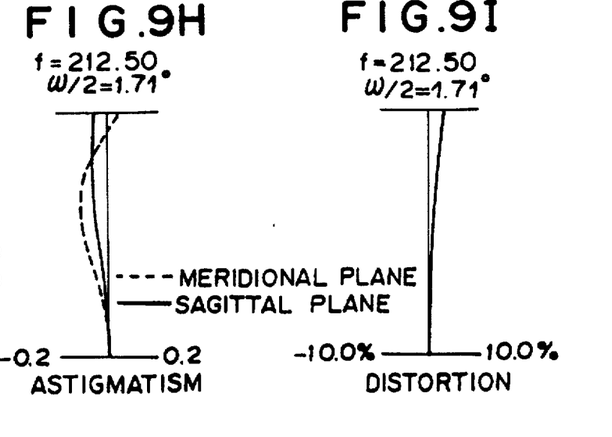

FIGS. 7A to 7C are views showing spherical aberration, astigmatism and distortion at a focal length of 8.29 mm of the zoom lens of the first embodiment, FIGS. 7D to 7F are views showing the same at a focal length of 207.13 mm and FIGS. 7G to 7I are views showing the same at a focal length of 414.27 mm. FIGS. 8A to 8C are views showing spherical aberration, astigmatism and distortion at a focal length of 8.26 mm of the zoom lens of the second embodiment, FIGS. 8D to 8F are views showing the same at a focal length of 206.48 mm and FIGS. 8G to 8I are views showing the same at a focal length of 412.96 mm. FIGS. 9A to 9C are views showing spherical aberration, astigmatism and distortion at a focal length of 12.28 mm of the zoom lens of the third embodiment, FIGS. 9D to 9F are views showing the same at a focal length of 122.83 mm and FIGS. 9G to 9I are views showing the same at a focal length of 212.50 mm. In the figures, ω denotes the angle of view.

As can be seen from FIGS. 7A to 9I, the zoom lenses of the first to third embodiments are all excellent in those aberrations.

When the rear focusing lens group is arranged to be controllable from the outside in a zoom lens employing the focusing system of the present invention, for example, fine focusing can be effected on the camera control unit side. Further when the mechanism is arranged so that after the operator moves the front focusing lens group to roughly focusing the zoom lens, the rear focusing lens group is moved, the zoom lens can be provided with an indirect auto-focusing function.

Figure 10:
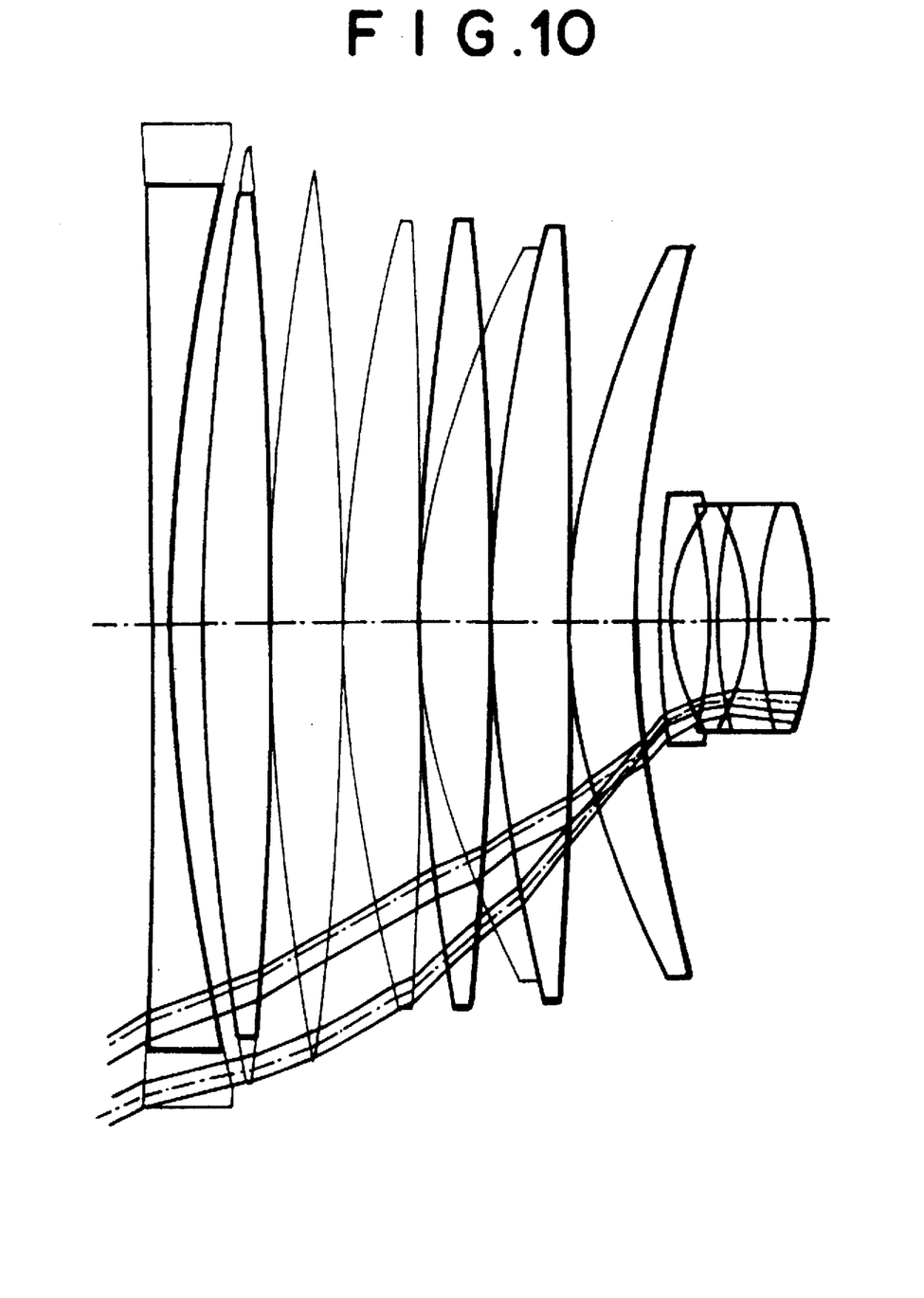
FIG. 10 shows the optical path when the zoom lens of the second embodiment is focused on a closest object point at the wide-side end by the focusing system of the present invention together with the same when the zoom lens is focused on the closest object point at the wide-side end by the conventional focusing system where the zoom lens is focused by moving solely the front lens group.

FIG. 10 shows the optical path when the zoom lens of the second embodiment is focused on a closest object point at the wide-side end by the focusing system of the present invention (shown by the thick line) together with the same when the zoom lens is focused on the closest object point at the wide-side end by the conventional focusing system where the zoom lens is focused by moving solely the front lens group. As can be understood from FIG. 10, when the focusing system of the present invention is employed, the diameter of the lenses may be smaller, whereby the front focusing lens group may be small in diameter and weight.

What is claimed is:

1. A zoom lens focusing system for focusing a zoom lens of a type including a front lens group at an object side of the lens, a zooming lens group which moves to accomplish zooming, and a relay lens group arranged in this order from the object side along an optical axis, comprising means for focusing the zoom lens by moving at least a part of the front lens group and a part of the relay lens group in the direction of the optical axis, wherein the relay lens group consists of first and second sets of lenses in this order from the object side, where the first set of lenses moves for focusing and the second set of lenses is fixed.

2. A zoom lens focusing system as defined in claim 1 wherein the means for focusing the zoom lens includes:

means for moving the front lens group so that the focusing movement of the front lens group for a given object point is smaller as compared with that by which the front lens group should be moved when the zoom lens is focused by moving solely the front lens group, and a focusing error generated by such a movement of the front lens group is larger in the wide-side than the tele-side, and means for moving said part of the relay lens group to correct the focusing error.

3. A zoom lens focusing system for focusing a zoom lens of a type including a front lens group, a zooming lens group and relay lens group arranged in this order from the object side, comprising:

focusing means for focusing the zoom lens by moving at least a part of the front lens group and a part of the relay lens group in the direction of the optical axis, wherein the front lens group is moved to satisfy the following formulae over the entire zooming range $$X' = X \cdot f(Z)$$
$$0 \leq f(Z) \leq 1$$
$$(1 - 4 \cdot Z_t/Z^2)^{1/2} \leq f(Z) \leq \log(Z)/\log(Z_t^{1/2})$$

wherein Zt represents the total zoom ratio of the zoom lens, f(Z) represents a function relating to the zoom ratio Z, X represents the movement by which the front lens group should be moved when the zoom lens is focused by moving solely the front lens group for a given finite object distance, and X' represents the movement by which the front lens group should be moved when the zoom lens is focused by moving the front lens group and a part of the relay lens group for the given finite object distance.

4. The zoom lens focusing system of claim 3 wherein the focusing means further includes:
means for moving the front lens group so that the focusing movement of the front lens group for a given object point is smaller as compared with that by which the front lens group should be moved when the zoom lens is focused by moving solely the front lens group, and a focusing error generated by such a movement of the front lens group is larger in the wide-side than the tele-side, and
means for moving said part of the relay lens group to correct the focusing error.

5. A zoom lens system comprising:
a set of lenses including a front lens group at an object side of the lens system, a zooming lens group which moves to accomplish zooming, and a relay lens group, arranged in this order from the object side along an optical axis; and
focusing means for focusing the zoom lens system by moving at least a part of the front lens group and a part of the relay lens group in the direction of the optical axis,
wherein the relay lens group consists of first and second sets of lenses in this order from the object side, where the first set of lenses moves for focusing and the second set of lenses is fixed.

6. The zoom lens system of claim 5 wherein the front lens group consists of a plurality of lenses, all of which are moved together by the focusing means to focus the zoom lens system.

7. The zoom lens system of claim 6 wherein the zooming lens group consists of first and second sets of lenses, the first set located adjacent to the front lens group and the second set located adjacent to the relay lens group, where said first and second sets move in opposed directions to accomplish zooming.

8. The zoom lens system of claim 5 wherein the front lens group consists of first and second sets of lenses arranged in that order from the object side, where the first set is fixed and the second set is moved by the focusing means to focus the zoom lens system.

9. The zoom lens system of claim 8 wherein the zooming lens group consists of first and second sets of zooming lenses, the first set of zooming lenses located adjacent to the front lens group and the second set of zooming lenses located adjacent to the relay lens group, where said first and second sets of zooming lenses move in opposed directions to accomplish zooming.

10. The zoom lens system of claim 5 wherein the front lens group consists of first and second sets of lenses arranged in that order from the object side, where the first set is moved by the focusing means to focus the zoom lens system, and the second set is fixed.

11. The zoom lens system of claim 10 wherein the zooming lens group consists of first and second sets of zooming lenses, the first set of zooming lenses located adjacent to the front lens group and the second set of zooming lenses located adjacent to the relay lens group, where said first and second sets of zooming lenses move in opposed directions to accomplish zooming.

* * * * *